(12) United States Patent
Hariharan et al.

(10) Patent No.: US 12,455,846 B2
(45) Date of Patent: Oct. 28, 2025

(54) USB SUSPEND MODE IN ISOLATED USB REPEATER

(71) Applicant: TEXAS INSTRUMENTS INCORPORATED, Dallas, TX (US)

(72) Inventors: Rakesh Hariharan, Bangalore (IN); Tarunvir Singh, Bangalore (IN); Anant Shankar Kamath, Bangalore (IN); Mark Edward Wentroble, Plano, TX (US); Christopher Joseph Rodrigues, Bangalore (IN); Prajwala Puttappa, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/732,391

(22) Filed: Apr. 28, 2022

(65) Prior Publication Data

US 2023/0111096 A1    Apr. 13, 2023

Related U.S. Application Data

(60) Provisional application No. 63/255,051, filed on Oct. 13, 2021.

(51) Int. Cl.
  *G06F 13/38* (2006.01)
  *G06F 13/42* (2006.01)

(52) U.S. Cl.
  CPC ........ *G06F 13/382* (2013.01); *G06F 13/4282* (2013.01); *G06F 2213/0042* (2013.01)

(58) Field of Classification Search
  CPC .................................................. G06F 13/4282
  See application file for complete search history.

(56) References Cited

U.S. PATENT DOCUMENTS

| | | | |
|---|---|---|---|
| 6,363,085 B1* | 3/2002 | Samuels | G06F 13/4045 370/242 |
| 6,820,160 B1* | 11/2004 | Allman | G06F 13/4072 710/36 |
| 2014/0006654 A1* | 1/2014 | Chan | G06F 13/385 710/16 |
| 2022/0350766 A1* | 11/2022 | Kamath | H03K 5/2472 |

\* cited by examiner

*Primary Examiner* — Henry Tsai
*Assistant Examiner* — Juanito C Borromeo
(74) *Attorney, Agent, or Firm* — Mandy Barsilai Fernandez; Frank D. Cimino

(57) ABSTRACT

In an example, a method of operating a repeater having an isolation barrier to isolate a host side of the repeater from a peripheral side of the repeater, the repeater operable to be coupled to a universal serial bus (USB), includes causing the host side to enter into a suspend mode. The method also includes, responsive to entering the suspend mode, disabling a host isolation transceiver at the host side. The method includes periodically enabling the host isolation transceiver to transmit a data signal from the host side to the peripheral side. The method includes exiting the suspend mode. The method also includes enabling the host isolation transceiver.

20 Claims, 5 Drawing Sheets

USB SUSPEND MODE IN ISOLATED USB REPEATER

CROSS-REFERENCE TO RELATED APPLICATIONS

The present application claims priority to U.S. Provisional Patent Application No. 63/255,051, which was filed Oct. 13, 2021, is titled "MEETING USB2.0 SUSPEND MODE (L2) LOW POWER REQUIREMENT IN ISOLATED USB REPEATER," and is hereby incorporated herein by reference in its entirety.

BACKGROUND

Universal Serial Bus (USB) is a standard that establishes specifications for cables, connectors, and protocols for connection, communication, and power supply between computers and peripherals. USB extenders or repeaters may be useful for extending the length of a USB connection. A USB repeater device with galvanic isolation may include two isolated USB controller chips that communicate with one another through isolation channels. The USB 2.0 standard has three different power modes, including L0 (Active mode), L1 (Sleep mode), and L2 (Suspend mode). USB repeaters and other USB devices should meet the requirements of the USB power modes to comply with the USB standard.

SUMMARY

In accordance with at least one example of the description, a method of operating a repeater having an isolation barrier to isolate a host side of the repeater from a peripheral side of the repeater, the repeater operable to be coupled to a USB, includes causing the host side to enter into a suspend mode. The method also includes, responsive to entering the suspend mode, disabling a host isolation transceiver at the host side. The method includes periodically enabling the host isolation transceiver to transmit a data signal from the host side to the peripheral side. The method includes exiting the suspend mode. The method also includes enabling the host isolation transceiver.

In accordance with at least one example of the description, a method of operating a repeater having an isolation barrier to isolate a host side of the repeater from a peripheral side of the repeater, the repeater operable to be coupled to a USB, includes measuring a first period of inactivity with a first timer on the peripheral side of the repeater. The method also includes responsive to the first period of inactivity being greater than a first predetermined value, entering a suspend mode on the peripheral side. The method includes measuring a second period of inactivity with a second timer on the host side of the repeater. The method also includes, responsive to the second period of inactivity being greater than a second predetermined value, entering the suspend mode on the host side, where the second predetermined value is greater than the first predetermined value.

In accordance with at least one example of the description, a system includes a USB repeater. The USB repeater includes a host analog front end (AFE) including a host isolation transceiver. The USB repeater also includes a peripheral AFE including a peripheral isolation transceiver. The USB repeater includes an isolation barrier between the host AFE and the peripheral AFE. The USB repeater also includes an isolation channel configured to communicate between the host isolation transceiver and the peripheral isolation transceiver across the isolation barrier, where the host isolation transceiver is configured to be disabled in a suspend mode and is configured to be periodically enabled to transmit a signal to the peripheral isolation transceiver, and where the host AFE is configured to draw less than 2.5 milliamps of current from a host while in the suspend mode.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
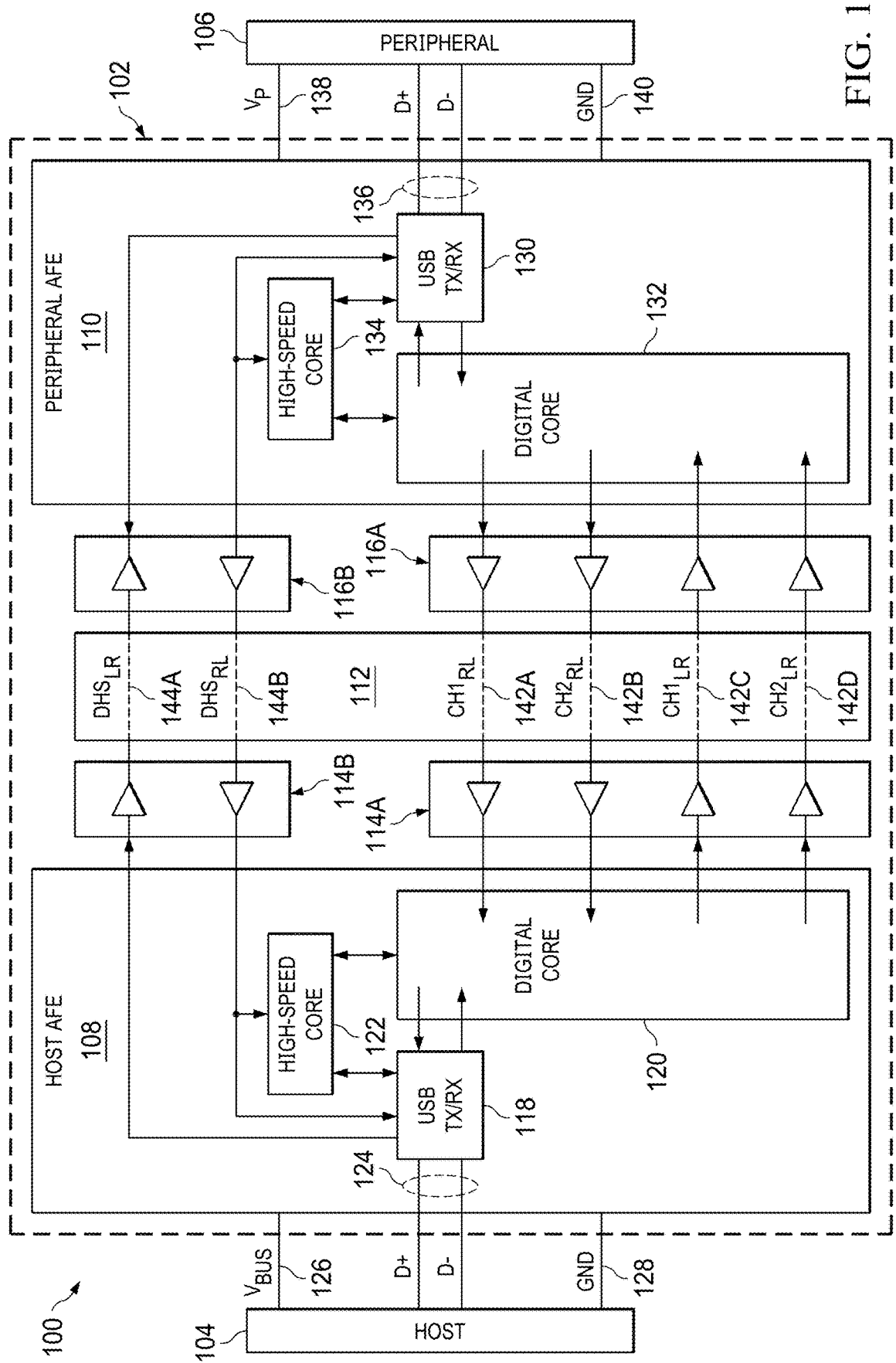
FIG. 1 is a block diagram of a system for a USB repeater with isolation in accordance with various examples.

A USB repeater may be useful for receiving and re-transmitting digital data to improve the signal quality over a long distance. The USB repeater may operate according to any of the USB standards, which are each incorporated by reference herein in their entirety. The repeater may have an upstream side (e.g., host or host side) and a downstream side (e.g., peripheral or peripheral side). Galvanic isolation is used in some repeaters to isolate the upstream side from the downstream side. With galvanic isolation, the ground potential on each side of the isolation may be different (e.g., the ground potential may be hundreds or thousands of volts apart), but no current will flow across the isolation. The repeater receives signals on one side and converts the signals to digital information that is conveyed across the isolation barrier to the other side via isolation channels.

The USB 2.0 standard includes a suspend mode that may also be referred to as a suspend state or L2. If a USB bus is inactive for a certain period of time, the host may suspend the bus, which suspends all activity across the isolation barrier. In the suspend mode, current consumption from the host to the repeater should be below 2.5 milliamps (mA) pursuant to the USB specification. However, in a repeater with isolation channels, each channel may consume 1.5 to 2.0 mA per channel in some examples, particularly if the channels use on-off keying (OOK) (e.g., to modulate data/information to transmit/receive across the isolation barrier). OOK is a modulation scheme that represents digital data as the presence or absence of a carrier wave. OOK has good performance in terms of reliability and noise, but may consume higher current than other modulation schemes. If these isolation channels are "on" and consuming current, the repeater cannot meet the 2.5 mA maximum current consumption during the suspend mode pursuant to the USB specification.

In examples herein, the isolation channels on the upstream side of the repeater may be turned "off" during the suspend mode. Turning "off" these isolation channels during the suspend mode allows the repeater to meet the current consumption requirements of the USB specification. To prevent the downstream side of the repeater from treating the isolation channel turn-off as a power loss, the isolation channels are periodically enabled to transmit a signal to the downstream side. A similar process may be performed on the downstream side in some examples, where the isolation channels on the downstream side are turned "off" and then periodically enabled to transmit a signal to the upstream side. In examples herein, the upstream side and downstream side may also have independent clocks and timers that ensure the downstream side enters the suspend mode before the upstream side. This technique allows the upstream and downstream sides to independently enter the suspend mode without an additional handshake operation between the two sides. The examples herein also include techniques for timely exiting suspend mode.

FIG. 1 is a block diagram of a system 100 for a USB repeater 102 with isolation in accordance with various examples herein. System 100 includes a USB repeater 102, a host 104, and a peripheral 106. USB repeater 102 includes a host analog front end (AFE) 108, a peripheral AFE 110, and an isolation barrier 112. The host AFE 108 may be referred to as an upstream AFE or an upstream side, and the peripheral AFE 110 may be referred to as a downstream AFE or a downstream side. In any of the examples herein, the upstream and downstream designations may be reversed and still fall within the scope of the description. USB repeater 102 also includes host isolation transceivers 114A and 114B. USB repeater 102 also includes peripheral isolation transceivers 116A and 116B.

Host AFE 108 includes a USB transceiver 118, a digital core 120, and a high-speed core 122. Digital core 120 and high-speed core 122 may include any hardware, software, firmware, digital logic, or circuitry for performing the operations described herein. In some examples, high-speed channels may be absent and a high-speed core 122 may also be absent.

Host AFE 108 is coupled to host 104. A differential bus (D+ and D−) 124 communicates data signals between host 104 and host AFE 108. A voltage bus 126 provides a voltage VBUS to host AFE 108. Host 104 also provides a ground connection GND 128 to host AFE 108. In some examples, VBUS is approximately 5 V.

Peripheral AFE 110 includes a USB transceiver 130, a digital core 132, and a high-speed core 134. Digital core 132 and high-speed core 134 may include any hardware, software, firmware, digital logic, or circuitry for performing the operations described herein. In some examples, high-speed channels may be absent and a high-speed core 134 may also be absent.

Peripheral AFE 110 is coupled to peripheral 106. A differential bus (D+ and D−) 136 communicates data signals between peripheral 106 and peripheral AFE 110. A voltage supply 138 provides a voltage $V_P$ to peripheral AFE 110. Peripheral 106 may also provide a ground connection GND 140 to peripheral AFE 110. GND 140 may be a different ground than GND 128, due to the isolation barrier 112 between host AFE 108 and peripheral AFE 110. In other examples, power and ground may be provided to peripheral AFE 110 from another component, or from an independent power supply. In some examples, peripheral 106 is self-powered. In other examples, repeater 102 may provide power to peripheral 106 via voltage supply 138 and/or GND 140.

Isolation barrier 112 may include capacitors, transformers, opto-couplers, or other components to isolate host AFE 108 from peripheral AFE 110. Isolation channels may include analog circuitry that is capable of communicating signals (e.g., digital signals or modulated signals carrying digital information) across isolation barrier 112. Isolation channels 142A, 142B, 142C, 142D, 144A, and 144B (collectively and/or individually referred to as isolation channel(s) 142) are shown in USB repeater 102. In this example, isolation channels 142A, 142B, 142C, 142D are low or regular (full) speed channels (e.g., 1.5 Mbps to 180 Mbps), and isolation channels 144A and 144B (collectively and/or individually referred to as isolation channel(s) 144) are high-speed channels (e.g., 480 Mbps or higher). As described above, high-speed channels may be absent in other examples. Also, the examples described herein may be applicable to low-speed channels, full-speed channels, or high-speed channels. In this example, two high-speed channels and four low-speed channels are shown, but any number of channels of any speed may be present in other examples.

In this example, host AFE 108 communicates across the isolation barrier 112 via host isolation transceivers 114A and 114B. Host isolation transceiver 114A transmits data to peripheral isolation transceiver 116A via isolation channels 142C and 142D. Peripheral isolation transceiver 116A transmits data to host isolation transceiver 114A via isolation channels 142A and 142B. Similarly, host isolation transceiver 114B transmits high-speed data to peripheral isolation transceiver 116B via isolation channel 144A. Peripheral isolation transceiver 116B transmits high-speed data to host isolation transceiver 114B via isolation channel 144B.

During normal operation of USB repeater 102 (e.g., Active mode L0), data is transmitted between the host 104 and peripheral 106 via USB repeater 102. If there is no data being sent for a specific period of time, such as 3 milliseconds (ms), host 104 may enter into a suspend mode (referred to as L2). In suspend mode, host 104 can suspend communication across differential bus 124, which also means that no data is communicated across the isolation channels 142 and 144 to peripheral 106. Suspend mode may be entered by turning off host isolation transceiver 114A in one example. During active mode, "keep alive" signals may be sent from host 104 to peripheral 106 to maintain the connection and keep the components in USB repeater 102 in an active state. However, in suspend mode, host 104 stops sending keep alive signals to peripheral 106. Host 104 stops sending keep alive signals due to the power requirements for suspend mode. To send keep alive signals, isolation channels would need to remain active, and the current consumption from the isolation channels would rise above 2.5 mA as required by the USB specification for suspend mode.

Without the keep alive signals, peripheral 106 may determine that a disconnect or power loss has occurred, and may take an appropriate action, such as shutting down. Peripheral 106 shutting down is undesirable if host 104 is merely in suspend mode, as host 104 may later exit suspend mode and attempt to communicate with peripheral 106. Therefore, as described herein, host isolation transceiver 114A is periodically turned on (with a low duty cycle) to transmit a data signal from host AFE 108 to peripheral AFE 110. This data signal notifies peripheral AFE 110 that host AFE 108 is still powered on, but is merely in suspend mode. By turning on the host isolation transceiver 114A for only a short period of time to send the data signal to peripheral AFE 110, the current consumption at host AFE 108 can remain below 2.5 mA as required for the suspend mode.

In another example, the periodic data signal during suspend mode may be transmitted from peripheral AFE 110 to host AFE 108. This periodic data signal notifies host AFE 108 that peripheral AFE 110 is in suspend mode and has not lost power or turned off.

Figure 2:
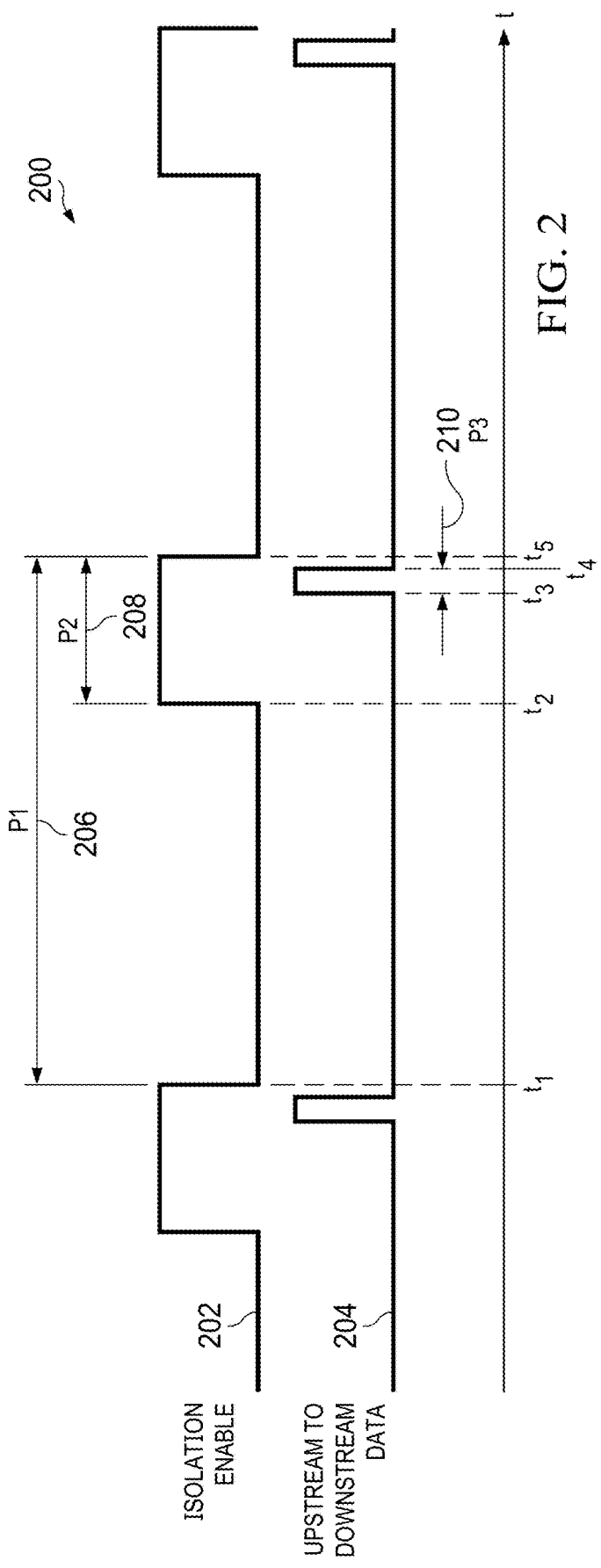
FIG. 2 is a timing diagram illustrating example waveforms for meeting suspend mode low power requirements in accordance with various examples.

FIG. 2 is a timing diagram showing example waveforms 200 for meeting suspend mode low power requirements in accordance with various examples herein. FIG. 2 shows waveform 202 and waveform 204. Waveform 202 represents the status of isolation transceivers, such as host isolation transceiver 114A in one example. If waveform 202 is low, host isolation transceiver 114A is off, and cannot transmit or receive data. In the off state, host isolation transceiver 114A may also draw very little or no power from host 104. If waveform 202 is high, host isolation transceiver 114A is on and is capable of transmitting and receiving data. Waveform 204 represents data transmitted from host AFE 108 to peripheral AFE 110 in one example. If waveform 204 is low, no data is being transmitted. If waveform 204 is high, a data signal is being transmitted across an isolation channel (such as isolation channels 142) by host isolation transceiver 114A.

Period P1 206 indicates one isolation enable period. During an isolation enable period, host isolation transceiver 114A is on for a portion of the period and off for the rest of the period. In this example, period P2 208 indicates the "on time" for host isolation transceiver 114A. At time $t_1$, period P1 206 begins. At time $t_2$, host isolation transceiver 114A is turned on, and period P2 208 begins. Period P1 206 and period P2 208 both end at time $t_5$.

During period P2 208, when host isolation transceiver 114A is turned on, a data signal is transmitted from host AFE 108 to peripheral AFE 110, as indicated by waveform 204. In this example, the data signal has a period P3 210, which begins at time $t_3$ and ends at time $t_4$. Times $t_3$ and $t_4$ occur during period P2 208, at which time host isolation transceiver 114A is turned on and capable of transmitting data to peripheral AFE 110. Therefore, as shown in FIG. 2, host isolation transceiver 114A may be turned on for a relatively short period of time (e.g., during P2 208) so a data signal may be transmitted (e.g., P3 210). After the data signal is transmitted, host isolation transceiver 114A is turned off (e.g., at time $t_5$). The periods may then repeat as shown in FIG. 2.

In an example, the isolation enable period (e.g., P1 206) is less than 1 ms. One example is a period P1 206 of 800 microseconds. The length of the "on-time" or duty cycle for host isolation transceiver 114A (period P2 208) may be a fraction of P1 206, such as 80 microseconds. As the fraction of P2/P1 (e.g., the duty cycle) gets smaller, more power is saved. For example, if P2 is 80 microseconds and P1 is 800 microseconds, P2/P1 is 10%, which means that power may be reduced approximately 90% compared to host isolation transceiver 114A being always on. The duration of P2 (e.g., the duty cycle) may be adjusted to achieve a target power consumption. Additionally, as shown in FIG. 2, the data signals of waveform 204 transmitted during period P3 210 may be transmitted towards the end of P2 208, to allow time for startup of host isolation transceiver 114A.

Figure 3:
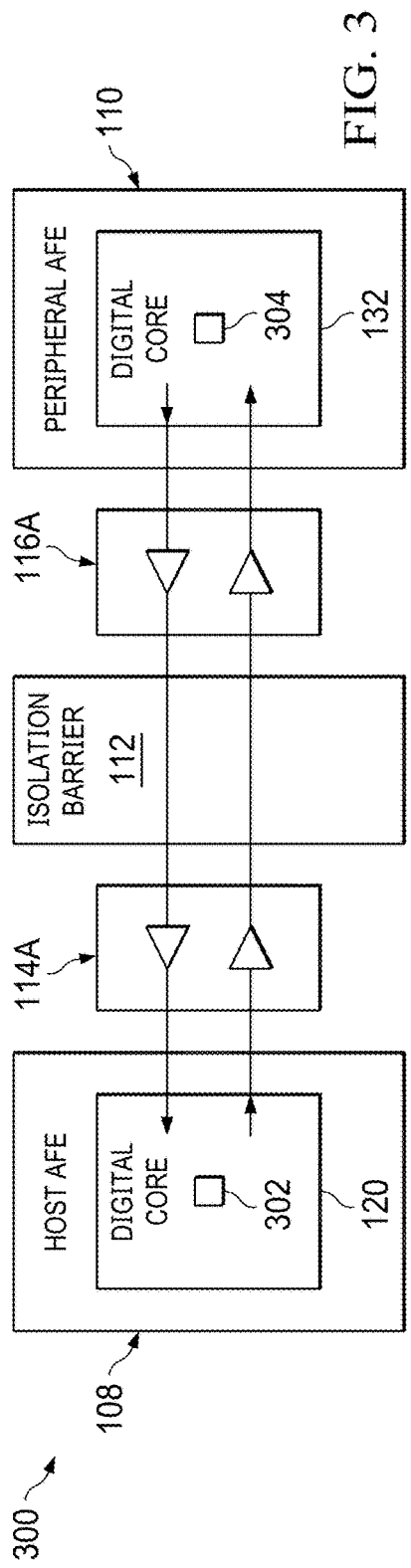
FIG. 3 is a block diagram of an example USB repeater with downstream and upstream timers in accordance with various examples.

FIG. 3 is a block diagram of an example USB repeater 300 with downstream and upstream timers in accordance with various examples herein. USB repeater 300 may be USB repeater 102 in some examples, and like numerals denote like components. Many of the components of USB repeater 300 are described above with respect to FIG. 1. In this example, host AFE 108 includes a timer 302, and peripheral AFE 110 includes a timer 304. In this example, timer 302 is in digital core 120, and timer 304 is in digital core 132. In other examples, timers 302 and 304 may be implemented in any hardware, software, or component of their respective AFEs.

The USB specification requires a host 104 or a peripheral 106 to enter suspend mode after 3 ms in an idle state (e.g., a predetermined period of inactivity). Also, the host 104 should meet the 2.5 mA suspend mode current limit after 10 ms in the idle state. To keep the host and peripheral synchronized across either side of the isolation barrier 112, timers 302 and 304 are used in one example.

The host AFE 108 and the peripheral AFE 110 have different clock references in this example. The host AFE 108 and the peripheral AFE 110 may be on separate silicon dies and/or in separate device packages and may not be matched due in part to the isolation between the two sides of the isolation barrier. The clocks may have high variation in one example to reduce the cost of the USB repeater. The clocks could vary by as much as 30% in some examples. However, by utilizing two different timers (302 and 304), the host AFE 108 and the peripheral AFE 110 may enter suspend mode independently without an additional handshake operation across isolation barrier 112.

In an example, peripheral AFE 110 has a shorter timer duration than host AFE 108 (e.g., peripheral AFE 110 may have a 3 ms timer 304, while host AFE 110 has a 6 ms timer 302). The difference between the timer durations should be large enough to account for the variation in the respective clocks. Clocks that have higher variation may require timer durations that are further apart. The 3 ms timer and the 6 ms timer described herein are just one example, and other predetermined values for the timers may be used in other examples. First, if timer 304 determines that 3 ms of no activity (e.g., idle) passes in peripheral AFE 110, peripheral AFE 110 goes into suspend mode. The peripheral AFE 110 then waits for a non-continuous signal from host AFE 108.

Second, the host AFE 108 will go to suspend mode later than peripheral AFE 110 due to the higher timer value of timer 302. If timer 302 determines that 6 ms of no activity passes in host AFE 108, host AFE 108 enters the suspend mode. Therefore, the peripheral AFE 110 will enter suspend mode before host AFE 108 as long as there is sufficient difference between timers 302 and 304. With this example system, host AFE 108 and peripheral AFE 110 can enter the suspend mode independently without an additional handshake operation, which would add complexity.

Figure 4:
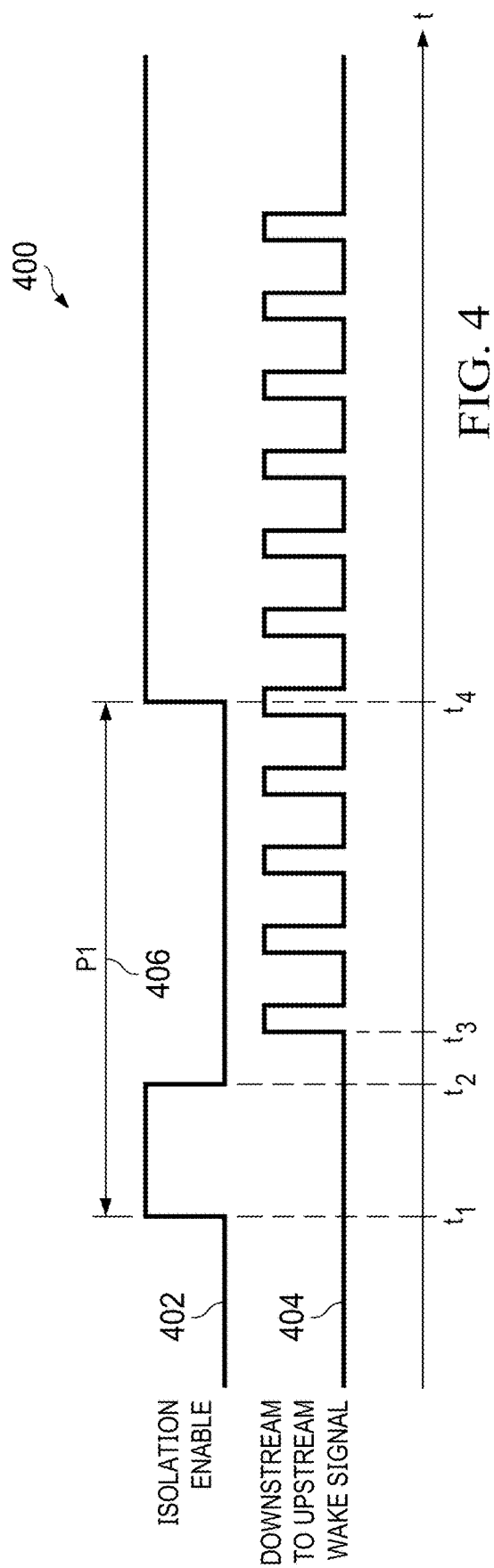
FIG. 4 is a timing diagram illustrating example waveforms for transitioning from suspend mode in accordance with various examples.

FIG. 4 is a timing diagram showing example waveforms 400 for transitioning from suspend mode in accordance with various examples herein. FIG. 4 shows waveform 402 and waveform 404. Waveform 402 represents the status of isolation transceivers, such as host isolation transceiver 114A in one example. If waveform 402 is low, host isolation transceiver 114A is off, and cannot transmit nor receive data. In the off state, host isolation transceiver 114A is drawing very little or no power from host 104. If waveform 402 is high, host isolation transceiver 114A is on, and is capable of transmitting and receiving data. Waveform 404 represents wake signal data transmitted from peripheral AFE 110 to host AFE 108 in one example. If waveform 404 is low, no data is being transmitted. If waveform 404 is high, a data signal is being transmitted using across an isolation channel (such as isolation channels 142) by peripheral isolation transceiver 116A.

Transitioning from the suspend mode occurs through either a resume signal (host driven) or a wake signal (peripheral driven). To exit from suspend mode via the host 104, host 104 can enable host isolation transceiver 114A. The isolation enable duty cycling (as shown in waveform 202 and 402) stops, and the peripheral AFE 110 is alerted that normal operation has resumed.

To wake from the suspend mode via the peripheral side, waveforms such as waveforms 400 may be used in one example. In other examples, waveform 404 may be different, such as a constant high signal. To wake via the peripheral side, a wake signal is sent from the peripheral AFE 110 to host AFE 108. However, if the wake signal is sent during the time period when host isolation transceiver 114A is off (such as between time $t_1$ and $t_2$ in FIG. 2), the wake signal would not be received by host AFE 108. To ensure that a wake signal from peripheral AFE 110 is received within 1 ms, the period of the duty cycle of the isolation enable signal should be less than 1 ms. In FIG. 4, waveform 402 has an isolation enable signal with a period P1 406. The period P1 406 should be less than 1 ms, such as 800 to 900 microseconds. Therefore, the host isolation transceiver 114A is activated at least once within each 1 ms window. By activating the host isolation transceiver 114A at least once each millisecond, host AFE 108 can determine within 1 ms that a wake has occurred on the peripheral side. After the wake signal is detected by host AFE 108, the isolation enable duty cycling of host isolation transceiver 114A can be stopped.

As an example, waveforms 400 begin with host 104 and peripheral 106 in the suspend mode. At time $t_1$, host isolation transceiver 114A is enabled. At time $t_2$, host isolation transceiver 114A is disabled, as no activity has occurred from peripheral 106 (as indicated by no activity on waveform 404). At time $t_3$, a wake signal is transmitted from peripheral AFE 110 to host AFE 108, as indicated by waveform 404. In this example, the wake signal is short and repeats, but wake signals of other durations and frequencies may be used in other examples.

At time $t_4$, host isolation transceiver 114A is enabled again. After time $t_4$, the enabled host isolation transceiver 114A receives the wake signal (waveform 404) transmitted from peripheral AFE 110 to host AFE 108. Host AFE 108 therefore recognizes that suspend mode has ended, and the duty cycling of host isolation transceiver 114A stops. After time $t_4$, waveform 402 remains high until suspend mode is entered again.

Figure 5:
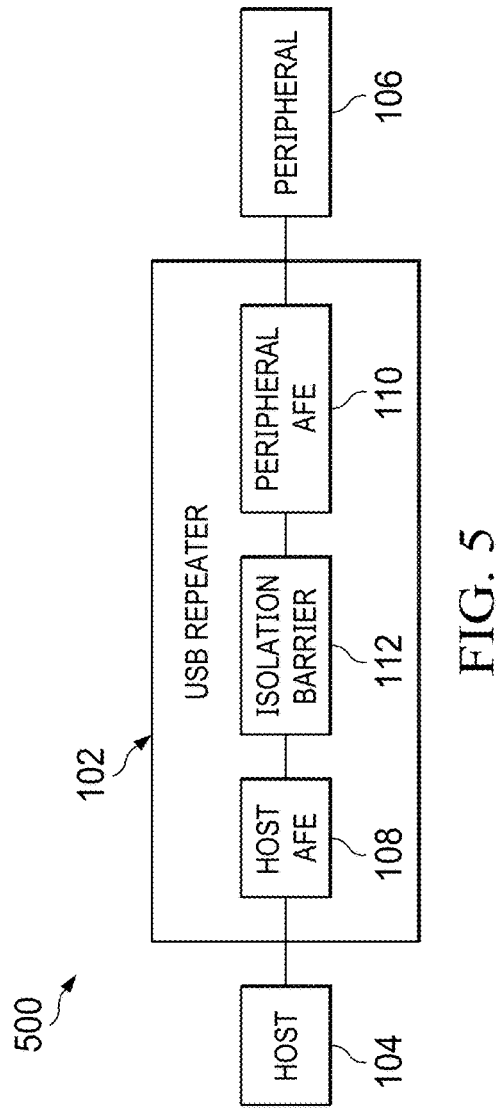
FIG. 5 is a block diagram of a system for a USB repeater with isolation in accordance with various examples.

FIG. 5 is a block diagram of a system 500 for a USB repeater 102 with isolation in accordance with various examples herein. System 500 includes a USB repeater 102 with a host AFE 108, a peripheral AFE 110, and an isolation barrier 112. USB repeater 102 transmits signals between host 104 and peripheral 106. Any number of peripherals 106 may be included in other examples. The host 104 may be any desktop computer, laptop, tablet, or other host device. Peripheral 106 may be any peripheral device, such as computer keyboards and mice, displays, video cameras, printers, scanners, portable media players, disk drives, and network adapters. Isolation barrier 112 may be any type of isolation barrier, and may provide galvanic isolation in one example.

Host AFE 108 and peripheral AFE 110 may include any suitable hardware, software, digital logic, or firmware to perform the operations described herein. USB repeater 102 may include other components not shown here, such as transceivers, ports, pins, connections, power connections, power supplies, power regulators, or any other electronic components.

Figure 6:
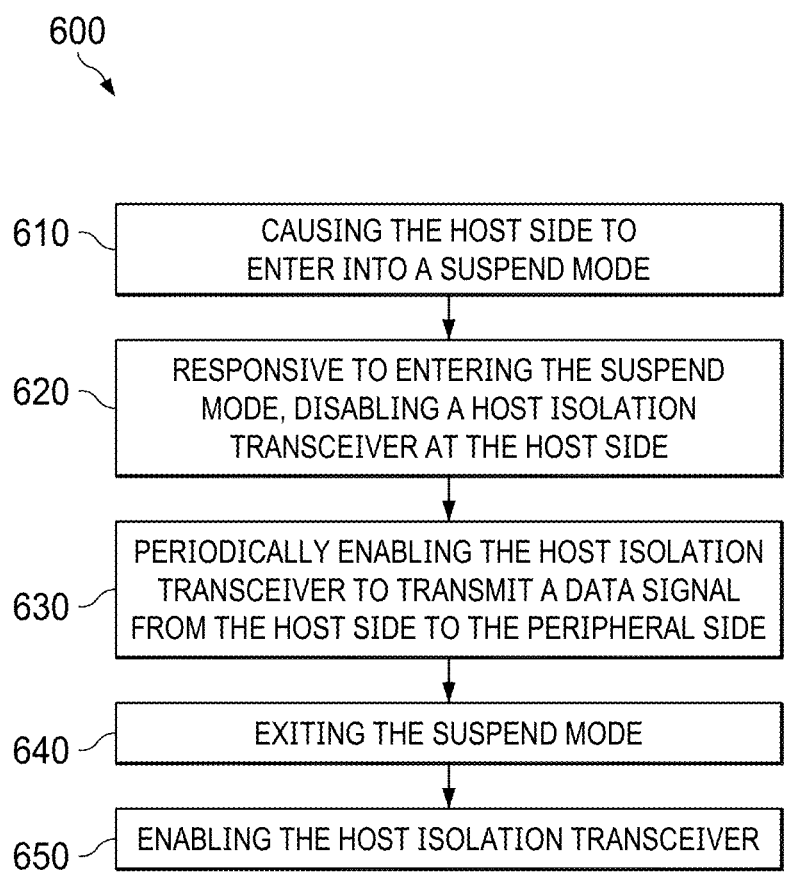
FIG. 6 is a flow diagram of a method for meeting USB 2.0 suspend mode power requirements in accordance with various examples.

FIG. 6 is a flow diagram of a method 600 for meeting USB 2.0 suspend mode power requirements in accordance with various examples. The steps of method 600 may be performed in any suitable order. The hardware components described above with respect to FIG. 1, 3, or 5 may perform method 600 in some examples. Any suitable hardware or digital logic may perform method 600 in some examples.

Method 600 begins at 610 where a host side of a USB repeater enters a suspend mode. In this example, the USB repeater includes an isolation barrier to isolate the host side from a peripheral side. An example USB repeater is described above with respect to FIG. 1.

Method 600 continues at 620, where responsive to entering the suspend mode, the host isolation transceiver is disabled at the host side. Hardware, software, or digital logic in host AFE 108 may disable the host isolation transceiver using any suitable circuitry or digital logic.

Method 600 continues at 630, where the host isolation transceiver is periodically enabled to transmit a data signal from the host side to the peripheral side. As described above with respect to FIG. 2 (waveform 202), host AFE 108 may enable the host isolation transceiver 114A for a predetermined period of time so as to enable a specific duty cycle that complies with power consumption requirements of the USB specification.

Method 600 continues at 640, where the host side exits the suspend mode. Suspend mode may be exited for any suitable reason. As an example, if a host 104 transmits data to USB repeater 102, USB repeater 102 may exit the suspend mode to continue transmitting the data to peripheral 106.

Method 600 continues at 650, where the host isolation transceiver 114A is enabled. After the host isolation transceiver 114A is enabled, the USB repeater may continue operation in an Active mode as described above.

In another example, instead of the host side entering the suspend mode, the peripheral side may enter the suspend mode and disable the peripheral isolation transceiver 116A. Then, the peripheral AFE 110 may periodically enable the peripheral isolation transceiver 116A to transmit a data signal from the peripheral side to the host side.

Figure 7:
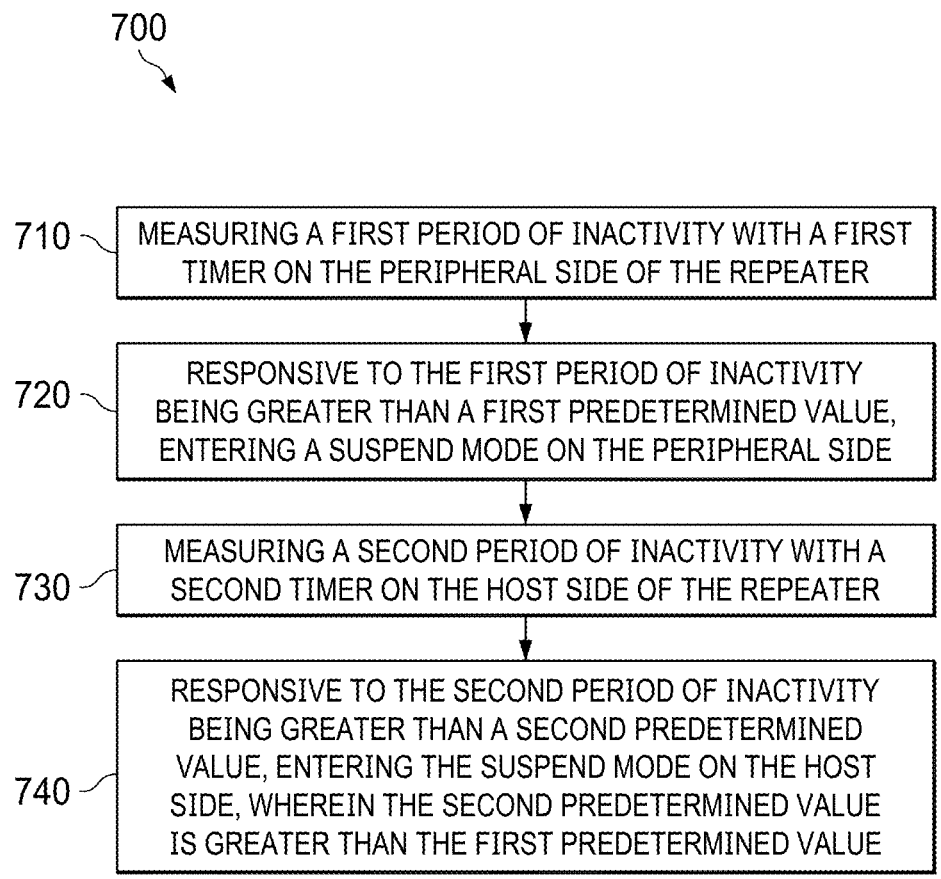
FIG. 7 is a flow diagram of a method for entering USB 2.0 suspend mode in accordance with various examples.

FIG. 7 is a flow diagram of a method 700 for entering USB 2.0 suspend mode in accordance with various examples. The steps of method 700 may be performed in any suitable order. The hardware components described above with respect to FIG. 1, 3, or 5 may perform method 700 in some examples. Any suitable hardware or digital logic may perform method 700 in some examples.

Method 700 begins at 710 where a first timer (e.g., timer 304) measures a first period of inactivity on a peripheral side of a USB repeater. In this example, the USB repeater includes an isolation barrier to isolate the peripheral side from a host side. The USB repeater may be USB repeater 102 as described above. The isolation barrier may provide galvanic isolation in one example. The first timer 304 may operate on a clock at the peripheral side of the USB repeater.

Method 700 continues at 720, where the peripheral side enters a suspend mode if the first period of inactivity is greater than a first predetermined value. In one example, if the period of inactivity is greater than 3 ms, the peripheral side enters the suspend mode.

Method 700 continues at 730, where a second timer measures a second period of inactivity on the host side of the USB repeater. The second timer may operate on a clock at the host side of the USB repeater.

Method 700 continues at 740, where the host side enters the suspend mode if the second period of inactivity is greater than a second predetermined value. The second predetermined value is greater than the first predetermined value in this example. For example, if the first predetermined value is 3 ms, the second predetermined value may be 6 ms. The predetermined values should be different enough so even with variations in the clocks on the host side and the peripheral side, the second value remains greater than the first value.

In examples herein, the isolation channels on the upstream side of the repeater may be turned off during a suspend mode. To prevent the downstream side of the repeater from treating the channel turn-off as a power loss, the isolation channels are periodically enabled to transmit a signal to the downstream side. A similar process may be performed on the downstream side in some examples, where the isolation channels on the downstream side are turned off and then periodically enabled to transmit a signal to the upstream side. In examples herein, the upstream side and downstream side may also have independent clocks and timers that ensure the downstream side enters the suspend mode before the upstream side. This technique allows the upstream and downstream sides to independently enter the suspend mode without an additional handshake operation between the two sides. In other examples herein, the USB repeater may transition from suspend mode via either a resume signal from the host side or a wake signal from the peripheral side. Also, the examples herein describe a USB repeater with galvanic isolation that provides high-speed data rates with on-off keying, and also meets the power consumption requirements of the USB 2.0 suspend mode.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin", "ball" and "lead" are used interchangeably. Unless specifically stated to the contrary, these terms are generally used to mean an interconnection between or a terminus of a device element, a circuit element, an integrated circuit, a device or other electronics or semiconductor component.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero. Modifications are possible in the described examples, and other examples are possible within the scope of the claims.

What is claimed is:

1. A method of operating a repeater having an isolation barrier, the method comprising:
   causing a host side to enter into a suspend mode wherein entering into the suspend mode includes suspending communications across the isolation barrier and disabling a host isolation transceiver at the host side;
   responsive to entering the suspend mode, disabling a host isolation transceiver at the host side;
   periodically enabling the host isolation transceiver and the isolation barrier to transmit a data signal from the host side to a peripheral side;
   exiting the suspend mode; and
   enabling the host isolation transceiver.

2. The method of claim 1, further comprising providing galvanic isolation between the host side and the peripheral side using the isolation barrier.

3. The method of claim 1, further comprising the host isolation transceiver transmitting the data signal to the peripheral side using one or more isolation channels across the isolation barrier.

4. The method of claim 1, further comprising the host isolation transceiver transmitting the data signal using on-off keying.

5. The method of claim 1, further comprising the host side drawing less than 2.5 milliamps of current from a host while in the suspend mode.

6. The method of claim 1, further comprising the host side of the repeater entering the suspend mode responsive to a predetermined period of inactivity.

7. The method of claim 1, wherein periodically enabling the host isolation transceiver includes enabling the host isolation transceiver with a duty cycle at or below 10%.

8. The method of claim 1, further comprising:
   causing the peripheral side to enter the suspend mode;
   responsive to entering the suspend mode, disabling a peripheral isolation transceiver at the peripheral side; and
   periodically enabling the peripheral isolation transceiver to transmit a data signal from the peripheral side to the host side.

9. The method of claim 1, wherein exiting the suspend mode comprises:
   receiving data from a host at the host side of the repeater;
   enabling the host isolation transceiver; and
   sending a resume signal to the peripheral side using the host isolation transceiver.

10. The method of claim 1, wherein exiting the suspend mode comprises:
    transmitting a wake signal from the peripheral side to the host side; and receiving the wake signal at the host side during a time when the host isolation transceiver is periodically enabled.

11. The method of claim 1, wherein periodically enabling the host isolation transceiver includes enabling the host isolation transceiver at least once per millisecond.

12. A method of operating a repeater having an isolation barrier, the method comprising:
measuring a first period of inactivity with a first timer on a peripheral side of the repeater;
responsive to the first period of inactivity being greater than a first predetermined value, entering a suspend mode on the peripheral side wherein entering into the suspend mode includes suspending communications across the isolation barrier and disabling a host isolation transceiver at a host side;
measuring a second period of inactivity with a second timer on a host side of the repeater; and
responsive to the second period of inactivity being greater than a second predetermined value, entering the suspend mode on the host side, wherein the second predetermined value is greater than the first predetermined value.

13. The method of claim 12, wherein the first timer and the second timer are configured to run on separate clocks.

14. The method of claim 12, wherein the peripheral side enters the suspend mode before the host side responsive to the second predetermined value being greater than the first predetermined value.

15. The method of claim 12, wherein the suspend mode is a USB 2.0 L2 state.

16. A system, comprising:
a universal serial bus (USB) repeater, including:
a host analog front end (AFE) including a host isolation transceiver;
a peripheral AFE including a peripheral isolation transceiver;
an isolation barrier between the host AFE and the peripheral AFE; and
an isolation channel configured to communicate between the host isolation transceiver and the peripheral isolation transceiver across the isolation barrier, wherein the host isolation transceiver is configured to be disabled in a suspend mode wherein entering into the suspend mode includes suspending communications across the isolation barrier and disabling a host isolation transceiver at a host side and is configured to be periodically enabled to transmit a signal to the peripheral isolation transceiver, and wherein the host AFE is configured to draw less than 2.5 milliamps of current from a host while in the suspend mode.

17. The system of claim 16, wherein the peripheral isolation transceiver is configured to be disabled in the suspend mode and is configured to be periodically enabled to transmit a signal to the host isolation transceiver.

18. The system of claim 16, wherein the USB repeater includes a low-speed isolation channel and a high-speed isolation channel.

19. The system of claim 16, wherein the isolation barrier is configured to provide galvanic isolation between the host AFE and the peripheral AFE.

20. The system of claim 16, wherein the suspend mode is a USB 2.0 L2 state.

* * * * *